United States Patent
Ji et al.

(10) Patent No.: US 9,748,052 B2
(45) Date of Patent: Aug. 29, 2017

(54) AUTOMATIC TRANSFER SWITCH AND METHOD THEREOF

(71) Applicant: Cummins Power Generation IP, Inc., Minneapolis, MN (US)

(72) Inventors: Brian Ji, Shanghai (CN); Daniel Wang, Shanghai (CN); David Cheng, Beijing (CN); Tony Hu, Shanghai (CN)

(73) Assignee: CUMMINS POWER GENERATION IP, INC., Minneapolis, MN (US)

(*) Notice: Subject to any disclaimer, the term of this patent is extended or adjusted under 35 U.S.C. 154(b) by 0 days.

(21) Appl. No.: 15/115,122

(22) PCT Filed: Jan. 30, 2014

(86) PCT No.: PCT/CN2014/071857
§ 371 (c)(1),
(2) Date: Jul. 28, 2016

(87) PCT Pub. No.: WO2015/113313
PCT Pub. Date: Aug. 6, 2015

(65) Prior Publication Data
US 2016/0351351 A1    Dec. 1, 2016

(51) Int. Cl.
*H01H 3/54* (2006.01)
*H02J 9/06* (2006.01)
*H01H 3/28* (2006.01)

(52) U.S. Cl.
CPC .............. *H01H 3/54* (2013.01); *H01H 3/28* (2013.01); *H02J 9/06* (2013.01); *H01H 2300/018* (2013.01)

(58) Field of Classification Search
CPC ....... H02J 9/06–9/08; H01H 3/28; H01H 3/54
USPC .................................................... 200/11 TC
See application file for complete search history.

(56) References Cited

U.S. PATENT DOCUMENTS

2010/0288610 A1   11/2010   Krieger et al.
2013/0015044 A1   1/2013    Lee et al.

FOREIGN PATENT DOCUMENTS

| CN | 101127278 | 2/2008 |
| CN | 101145468 | 3/2008 |
| CN | 101231915 | 7/2008 |
| CN | 101441945 | 5/2009 |

OTHER PUBLICATIONS

International Search Report for PCT/CN2014/071857, issued Nov. 3, 2014, 3 pages.

*Primary Examiner* — Ramon M Barrera
(74) *Attorney, Agent, or Firm* — Foley & Lardner LLP

(57) ABSTRACT

A system and method for an automatic transfer switch comprising a fixed contact, a first oscillating rod communicatively and operatively connected to a first movable contact, a second oscillating rod communicatively and operatively connected to a second movable contact, a link rod communicatively and operable connected to the first and second oscillating rods, and a guide plate. The automatic transfer switch is operable to position the guide plate based at least on a state of a solenoid. A permanent magnetic actuator communicatively and operatively connected to the link rod via a third oscillating rod is operable to rotate the first oscillating rod or the second oscillating rod based at least on the position of the guide plate.

14 Claims, 5 Drawing Sheets

AUTOMATIC TRANSFER SWITCH AND METHOD THEREOF

CROSS-REFERENCE TO RELATED APPLICATIONS

The present application is a U.S. National Stage Application claiming the benefit of International Application No. PCT/CN2014/071857, filed on Jan. 30, 2014, the entire contents of which are incorporated herein by reference in their entirety.

TECHNICAL FIELD

This present application relates to an automatic transfer switch (ATS) operating mechanism comprising a magnetic actuator and a solenoid.

BACKGROUND

Many automatic transfer switches utilize solenoid or motor operating mechanisms to perform opening and closing operations. Solenoid or motor operating mechanisms can contain complicated structures. For example, the operating mechanisms can include exclusive locking and tripping components to maintain the opening and closing states. Because of the number of components and the precision of manufacturing needed, traditional automatic transfer switches are susceptible to reduced reliability and consistency.

Permanent magnetic operating mechanisms have been applied in medium-voltage vacuum circuit breakers. Existing research on automatic transfer switches have utilized two permanent magnetic operating mechanisms to operate two movable contact subsystems separately. However, these switches can misoperate. Additionally, these switches cannot perform manual operations.

SUMMARY

A system and method for an automatic transfer switch comprising a fixed contact, a first oscillating rod communicatively and operatively connected to a first movable contact, a second oscillating rod communicatively and operatively connected to a second movable contact, a link rod communicatively and operatively connected to the first and second oscillating rods, and a guide plate. The automatic transfer switch is operable to position the guide plate based at least on a state of a solenoid. A permanent magnetic actuator that is communicatively and operatively connected to the link rod via a third oscillating rod is operable to rotate the first oscillating rod or the second oscillating rod based at least on the position of the guide plate.

Various embodiments of the automatic transfer switches described herein may result in improved reliability and an extended lifetime. Additionally, in various embodiments, the overall complexity and precision required in the manufacture of the automatic transfer switch may be reduced.

These and other features, together with the organization and manner of operation thereof, will become apparent from the following detailed description when taken in conjunction with the accompanying drawings.

DETAILED DESCRIPTION OF VARIOUS EMBODIMENTS

Referring to the figures generally, the various embodiments disclosed herein relate to an automatic transfer switch ("ATS") having a permanent magnetic actuator and a solenoid. The permanent magnetic actuator operates transmission components to open or close movable contact subsystems onto fixed contact subsystems. A solenoid switch is used to select a first movable contact subsystem ("source A") or a second movable contact subsystem ("source B"). The operation of the transmission components by the permanent magnetic actuator moves the selected movable contact subsystem into an open or closed position. The movable contact subsystems are held in place using the force generated from the permanent magnetic actuator without relying on traditional mechanical locking and tripping devices. In addition, the various embodiments disclosed herein maintain a manual operation mode of the ATS.

Figure 1:
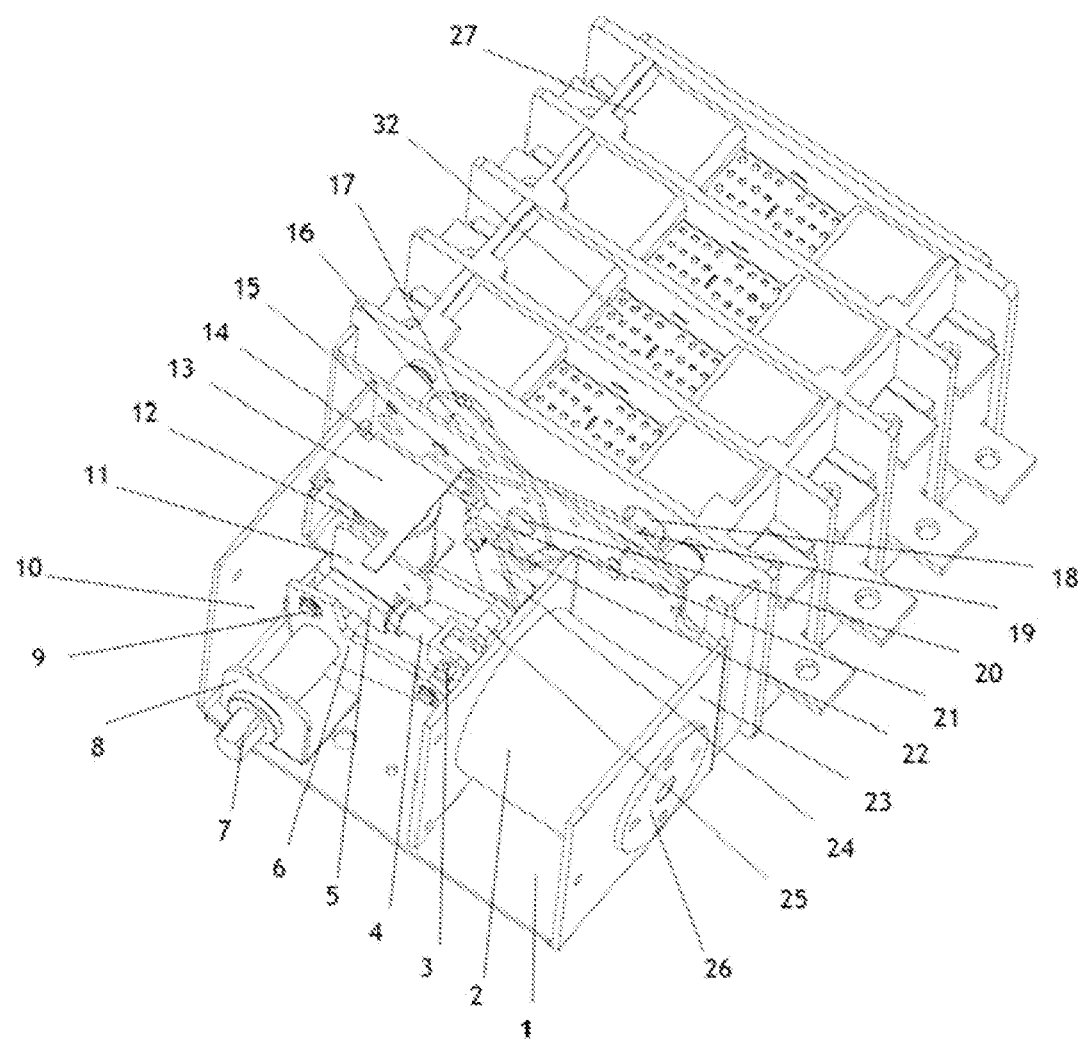
FIG. 1. is an isometric view of an automatic transfer switch according to an example embodiment.

Referring to FIG. 1, a structure view of an automatic transfer switch is illustrated according to an example embodiment. At least two two-pole contact systems 27 are coupled to a baseplate 1 on either the left or right side of the baseplate 1. Rotating square shafts 16,18 are connected to the baseplate 1 through holes. A first rotating square shaft 16 is coupled to and rotates with a first oscillating rod 17, and a second rotating square shaft 18 is coupled to and rotates with a second oscillating rod 19. There is a slot in each of the first and second oscillating rods 17, 19. The slots are staggered arranged axially. The two slots form a "V" shape which corresponds to a "V" slot in baseplate 1. A pin 22 covered by a sleeve 21 passes through the two "V" slots and connects to a link rod 24. The pin 22 pushes the first and second oscillating rods 17,19, each of which rotates separately along the slots of the first and second oscillating rods 17,19.

A permanent magnetic actuator 2 is fixed to a bracket 23 through a plate 26. The bracket 23 is fixed to the baseplate 1. One end of the permanent magnetic actuator 2 connects with a link rod 4 via a pin 3. The link rod 4 connects to a square rod 5 by a threaded connection. The square rod 5 connects to a third oscillating rod 6 via a pin 9. The third oscillating rod 6 connects to and rotates with rotating square shaft 7. One end of the rotating square shaft 7 connects to the baseplate 1 through a bearing hole and the other end of the rotating square shaft 7 connects to a bracket 8 through a bearing hole. The bracket 8 is fixed on the baseplate 1. The third oscillating rod 6 further connects with the link rod 24 by a pin 25. A solenoid 12 is fixed to a bracket 11, and the bracket 11 is fixed to a bracket 10. The bracket 10 is fixed to the baseplate 1. A plate 13 connects with the bracket 11 at one end in a hinged manner and touches the free end of the solenoid 12 with a face of plate 13. A guide plate 15 connects to the baseplate 1 by a pin 20 and also connects to the plate 13 by a pin 14, allowing it to be operatively rotated by solenoid 12.

Figure 2:
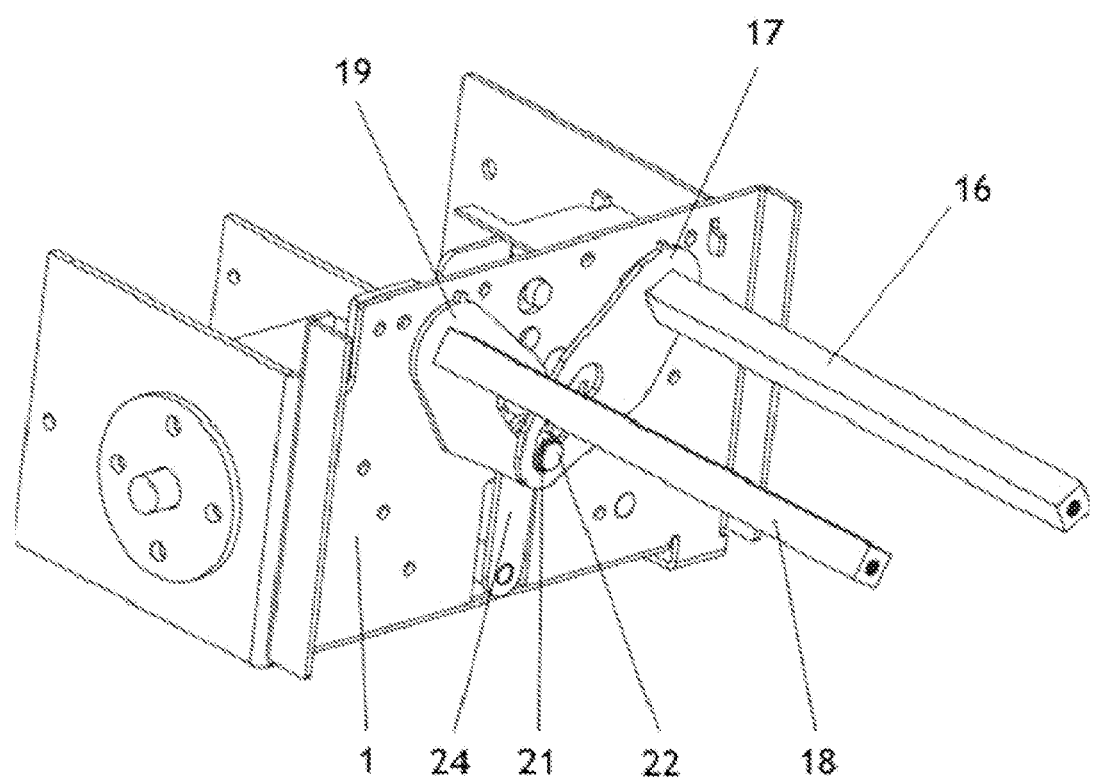
FIG. 2 is an isometric view of the automatic transfer switch of FIG. 1 with the contact and arc chute components removed.

Referring to FIG. 2, an isometric view of the automatic transfer switch of FIG. 1 with the contact and arc chute components removed is illustrated. The pin 22 covered by the sleeve 21 passes through a "V" slot in the baseplate 1 and the slots of the first and second oscillating rods 17, 19 and connects to the link rod 24. The solenoid 12 via guide plate 15 (not shown) selects one of the two legs of the "V" in the baseplate 1 for the pin 22 to operate along. The pin 22 pushes the first and second oscillating rods 17,19, each of which rotate separately along the slots of the first and second oscillating rods 17, 19. Rotating square shafts 16 and 18 are fixed to the first and second oscillating rods 17, 19, respectively, and rotate with the respective oscillating rod.

As shown in FIGS. 3A, 3B, 4A, 4B, 5A, and 5B, the ATS can be configured to one of three states. The states include a neutral position, occurring when the permanent magnet actuator 2 has drawn the link rod 24 and the pin 22 to the bottom of the "V" in baseplate 1, and wherein both the source A movable contact subsystem 30 and the source B movable contact subsystem 28 are in an open position (i.e., not in contact with the fixed contact subsystem 29). The two-pole contact system includes at least two movable contact subsystems, a fixed contact subsystem 29, protective shells 31, and an arc chute system 32 which are assembled between the source A and source B movable contact subsystems 30,28. The source A movable contact subsystem 30 is fixed to the rotating square shaft 16. The source A movable contact subsystem 30 rotates with the rotating square shaft 16 and couples the fixed contact subsystem 29 to the source A input. The source B movable contact subsystem 28 is fixed to the rotating square shaft 18. The source B movable contact subsystem 28 rotates with the rotating square shaft 18 and couples the fixed contact subsystem 29 to the source B input.

Figure 3A:
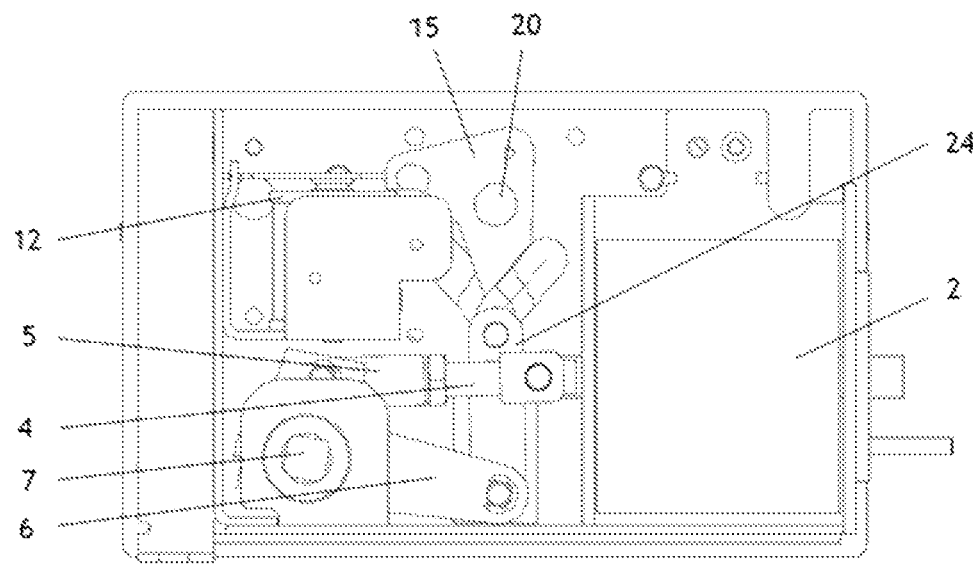
FIG. 3A is a sectional side view of the permanent magnetic actuator of the automatic transfer switch of FIG. 1 with the link rod in a neutral position.
Figure 3B:
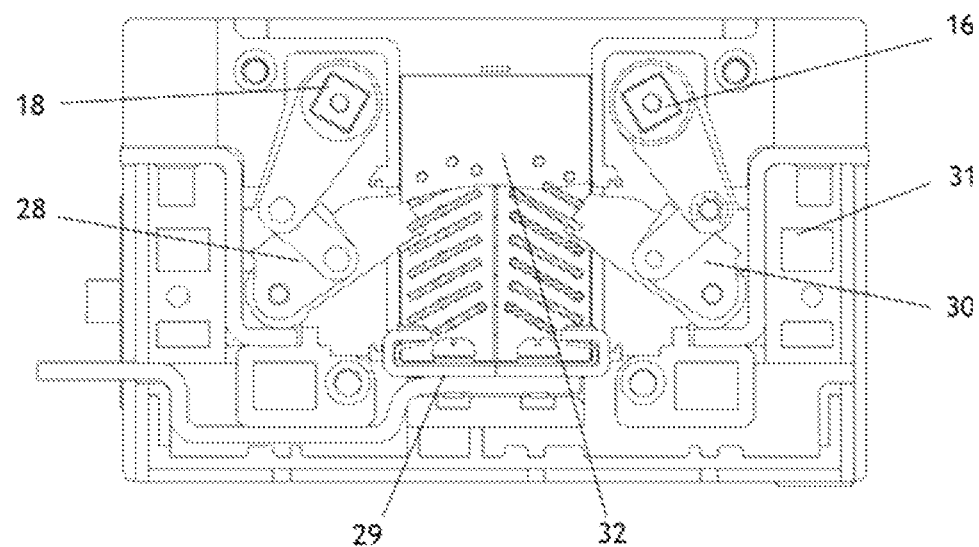
FIG. 3B is a sectional side view of a two-pole contact system of the automatic transfer switch of FIG. 1, with the first and second movable contact subsystems in a neutral position.

FIG. 3A is a sectional side view of the permanent magnetic actuator 2 of the automatic transfer switch of FIG. 1 with the link rod 24 and the pin 22 in a neutral position at the bottom of the "V" in the baseplate 1. FIG. 3B is a sectional side view of a two-pole contact system of the automatic transfer switch of FIG. 1, with the first and second movable contact subsystems in a neutral position and the fixed contact subsystem 29 not coupled to either the source A movable contact subsystem 30 or the source B movable contact subsystem 28. The permanent magnetic actuator 2 pulls the link rod 4 and the square rod 5, thereby causing the third oscillating rod 6 to rotate to a pre-determined angle with a range of 20°~30° in a clockwise direction along the rotating square shaft 7, and then maintain the position of the oscillating rod 6 at the predetermined angle. It is noted that the permanent magnet actuator 2 in various embodiments can be either bistable, with permanent magnetic holding states at each first and second end of its throw, or monostable, with only a single permanent magnetic holding state at a first end of its throw and the other state or second throw end held only when activated. The rotating third oscillating rod 6 pulls the link rod 24 down with the pin 22 and the sleeves 21 moving along the "V" slot in the baseplate 1 to the bottom, keeping the movable contact subsystems 28, 30 in an open neutral position and is held in place by either permanent magnetic force or by the activated state of the permanent magnetic actuator 2. In the illustrated embodiment, the solenoid 12 is kept still and does not actuate. The first and second oscillating rods 17, 19 both stay in a position corresponding to the pre-determined angle that the rotating square shafts 16, 18 are rotated to, thereby placing the movable contact subsystems 28, 30 in a neutral position at a distance from the fixed contact subsystem 29. The distance can be, for example, a distance corresponding to a maximum angle from the fixed contact subsystem 29.

Figure 4A:
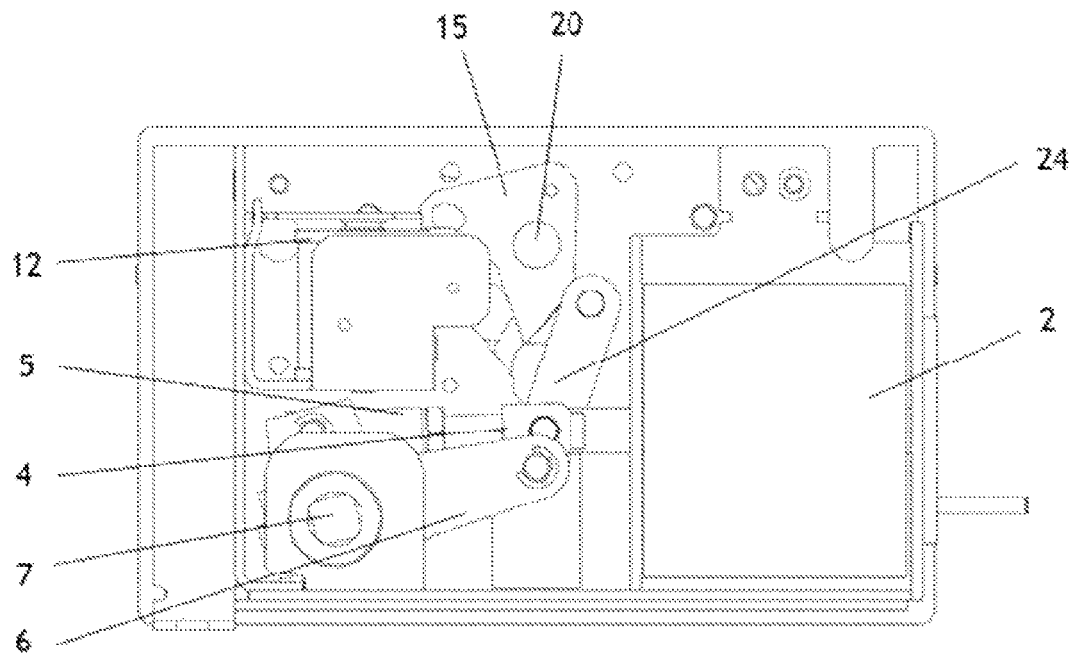
FIG. 4A is a sectional side view of the permanent magnetic actuator of the automatic transfer switch of FIG. 1 with the link rod in a first position.
Figure 4B:
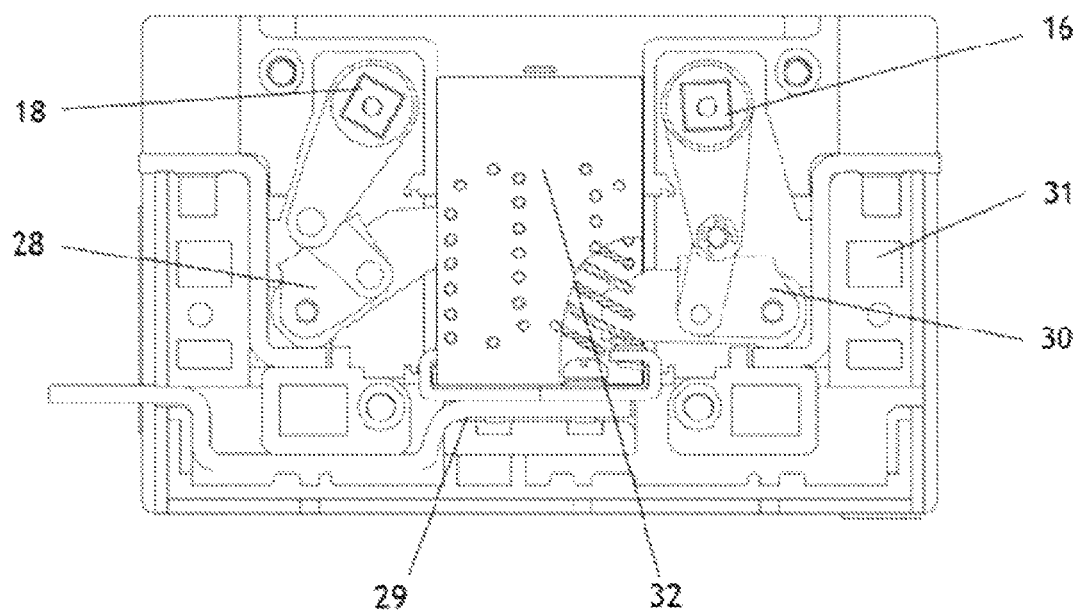
FIG. 4B is a sectional side view of a two-pole contact system of the automatic transfer switch of FIG. 1 with the first movable contact subsystem in a closed position.

FIG. 4A is a sectional side view of the permanent magnetic actuator of the automatic transfer switch of FIG. 1 with the link rod 24 in a first position. Referring to FIG. 4B, a sectional side view of a two-pole contact system of the automatic transfer switch of FIG. 1 with the first movable contact subsystem in a closed position is illustrated. The permanent magnetic actuator 2 utilizes permanent magnetic holding force to push the link rod 4 and the square rod 5, thereby causing the third oscillating rod 6 to rotate to a pre-determined angle in a counterclockwise direction along the rotating square shaft 7 while maintaining the position of the oscillating rod 6. The third oscillating rod 6 pushes the link rod 24 upward with the pin 22 and the sleeve 21 moving along the right side of the "V" slot on the baseplate 1 and the slot of the second oscillating rod 19 to the top side while maintaining the position of the link rod 24. In the illustrated embodiment, the solenoid 12 does not move, leaving guide plate 15 in a first position to guide the movement of the pin 22 and the sleeve 21 along the right side of the "V" slot on the baseplate 1. The oscillating rod 19 does not move, and the first oscillating rod 17 is pushed upward by the pin 22 and the sleeve 21 with the rotating square shafts 16 rotating to a pre-determined angle, whereby the source A movable contact subsystem 30 comes into contact with the fixed contact subsystem 29 coupling the source A to the fixed contact subsystem 29 and the source B movable contact subsystem 28 remains at a distance from the fixed contact subsystem 29 in a neutral position. The distance of the source B movable contact subsystem 28 can be, for example, a distance corresponding to a maximum angle from the fixed contact subsystem 29.

Figure 5A:
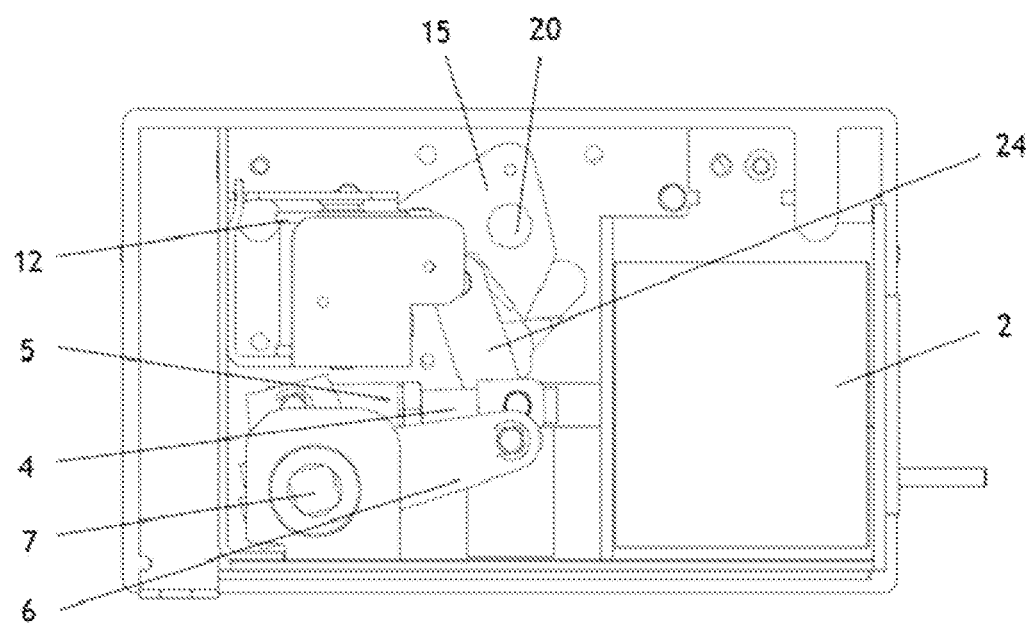
FIG. 5A is a sectional side view of the permanent magnetic actuator of the automatic transfer switch of FIG. 1 with the link rod in a second position.
Figure 5B:
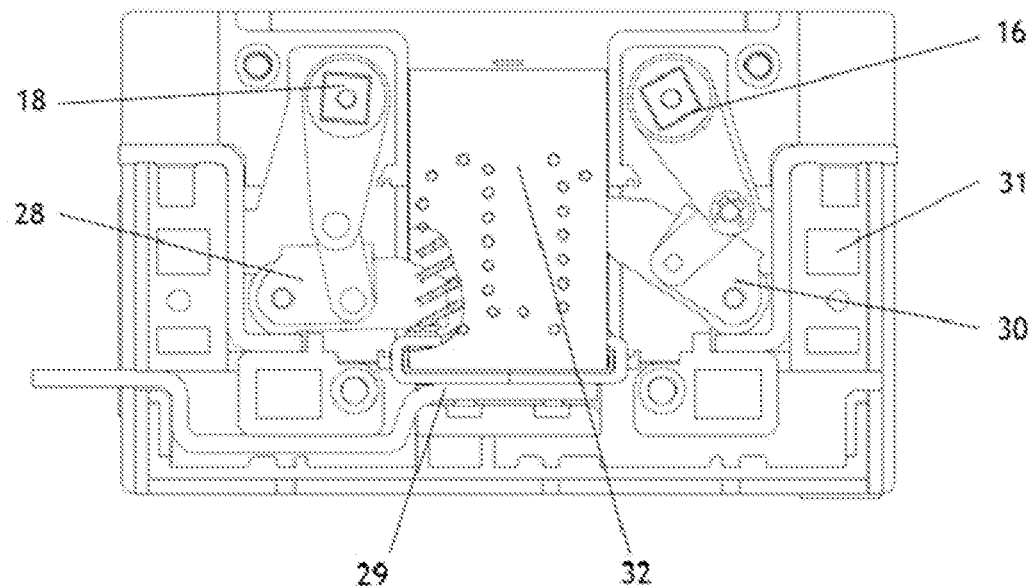
FIG. 5B is a sectional side view of a two-pole contact system of the automatic transfer switch of FIG. 1 with the second movable contact subsystem in a closed position.

Referring to FIG. 5A, a sectional side view of the permanent magnetic actuator 2 of the automatic transfer switch of FIG. 1 with the link rod 24 in a second position is illustrated. Referring to FIG. 5B, a sectional side view of a two-pole contact system of the automatic transfer switch of FIG. 1 with the second movable contact subsystem in a closed position is illustrated. The permanent magnetic actuator 2 utilizes a permanent magnetic holding force to the push link rod 4 and the square rod 5, thereby driving the third oscillating rod 6 to rotate to a pre-determined angle in a counterclockwise direction along with the rotating square shaft 7 while maintaining the position of the oscillating rod 6. The third oscillating rod 6 pushes the link rod 24 upward with the pin 22 and the sleeve 21 moving along the left side of the "V" slot on the baseplate 1 and the slot of first oscillating rod 17 to the top side while maintaining the position of the link rod 24. In the illustrated embodiment, the solenoid 12 is energized to rotate the guide plate 15 to a second position along the pin 20 to guide the movement of the pin 22 and the sleeve 21 along the left side of the "V" slot on the baseplate 1. The first oscillating rod 17 does not move and the second oscillating rod 19 is pushed upward by the pin 22 and the sleeve 21 with the rotating square shaft 18 rotating a pre-determined angle so that the source B movable contact subsystem 28 is in contact with the fixed contact subsystem 29 coupling the source B to the fixed contact subsystem 29. The source A movable contact subsystem 28 remains at a distance from the fixed contact subsystem 29 in a neutral position. The distance can be, for example, a distance corresponding to a maximum angle from the fixed contact subsystem 29.

In an embodiment, the ATS can transition from the configuration illustrated in FIGS. 4A and 4B to the configuration illustrated in FIGS. 5A and 5B, or vice versa. In an embodiment, the source A movable contact subsystem 30 can be opened to a neutral position (e.g., the position illustrated in FIG. 3). The source B movable contact subsystem 28 can already be in a neutral position. Once both movable contact subsystems are in the neutral position, the source B movable contact subsystem 28 can be moved to a closed position by, for example, the process described above in relation to FIGS. 5A and 5B. It will be apparent to one skilled in the art that a similar process can be used when the source B movable contact subsystem 28 is initially in contact with the fixed contact subsystem 29 and the source A movable contact subsystem 30 is initially in a neutral position.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that, unless specifically noted, many modifications are possible (e.g., variations in sizes, structures, shapes and proportions of the various elements, values of parameters, mounting arrangements, use of materials, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. Unless specifically noted, the order or sequence of any process or method steps may be varied or re-sequenced according to alternative embodiments. Other substitutions, modifications, changes and omissions may also be made in the design, operating conditions and arrangement of the various example embodiments without departing from the scope of the present invention.

What is claimed is:

1. An automatic transfer switch, comprising: a fixed contact; a first oscillating rod communicatively and operatively connected to a first movable contact; a second oscillating rod communicatively and operatively connected to a second movable contact; a link rod communicatively and operable connected to the first oscillating rod and the second oscillating rod; a guide plate, wherein a position of the guide plate is changed based at least on a state of a solenoid; and a permanent magnetic actuator communicatively and operatively connected to the link rod via a third oscillating rod, wherein the permanent magnetic actuator is configured to rotate one of the first oscillating rod and the second oscillating rod based at least on the position of the guide plate.

2. The automatic transfer switch of claim 1, wherein the automatic transfer switch is configured to be placed in one of a neutral state, a first state, and a second state.

3. The automatic transfer switch of claim 2, wherein the first movable contact and the second movable contact are positioned away from the fixed contact when the automatic transfer switch is in the neutral state.

4. The automatic transfer switch of claim 3, wherein the first movable contact and the second movable contact are positioned away at a predetermined rotational angle.

5. The automatic transfer switch of claim 2, wherein the first movable contact is in communication with the fixed contact and the second movable contact is positioned away from the fixed contact when the automatic transfer switch is in the first state.

6. The automatic transfer switch of claim 2, wherein the first movable contact is positioned away from the fixed contact and the second movable contact is in communication with the fixed contact when the automatic transfer switch is in the second state.

7. The automatic transfer switch of claim 2, wherein the permanent magnetic actuator is operable to change the state of the automatic transfer switch from the first state to the second state.

8. The automatic transfer switch of claim 7, wherein the permanent magnetic actuator is operable to change the state of the automatic transfer switch from the first state to the second state via the neutral state.

9. The automatic transfer switch of claim 8, wherein at least the first or the second movable contact is positioned away from fixed contact.

10. The automatic transfer switch of claim 1, wherein the permanent magnetic actuator exerts a permanent magnetic holding force and is at least one of a bistable or monostable permanent magnetic actuator.

11. A method comprising:
positioning, by a permanent magnetic actuator, a link rod to a neutral state from a first state;
rotating a first oscillating rod based at least on positioning the link rod to the neutral state, the rotated first oscillating rod positioning a first movable contact at a distance from a fixed contact;
positioning a guide plate based at least on a state of a solenoid;
positioning, by the permanent magnetic actuator, the link rod to a second state from the neutral state based at least on the positioned guide plate; and
rotating a second oscillating rod based at least on positioning the link rod to the second state,
wherein the rotated second oscillating rod is in communication with the fixed contact.

12. The method of claim 11, wherein the state of the solenoid is manually changed.

13. The method of claim 11, wherein the permanent magnetic actuator rotates the link rod based at least on a permanent magnetic holding force.

14. The method of claim 11, wherein at least the first movable contact or a second movable contact is positioned away from the fixed contact.

\* \* \* \* \*